United States Patent
Henson et al.

(10) Patent No.: US 6,814,222 B2
(45) Date of Patent: Nov. 9, 2004

(54) NARROW BELT NON-PNEUMATICALLY ACTUATED ACCUMULATION CONVEYOR

(75) Inventors: Mark W. Henson, Danville, KY (US); James M. Dickman, Rising Sun, IN (US); James W. Halsey, Cincinnati, OH (US); Michael O. Piazza, Danville, KY (US); by by A. Shields, Danville, KY (US)

(73) Assignee: FKI Logistex Automation Inc., Cincinnati, OH (US)

(*) Notice: Subject to any disclaimer, the term of this patent is extended or adjusted under 35 U.S.C. 154(b) by 10 days.

(21) Appl. No.: 10/357,009

(22) Filed: Feb. 3, 2003

(65) Prior Publication Data

US 2004/0149546 A1 Aug. 5, 2004

(51) Int. Cl.[7] ............................................. B65G 13/06
(52) U.S. Cl. .............................. 198/781.06; 198/781.09
(58) Field of Search ....................... 198/781.06, 781.09, 198/781.1

(56) References Cited

U.S. PATENT DOCUMENTS

| | | | | |
|---|---|---|---|---|
| 3,730,330 | A | * | 5/1973 | De Good ............... 198/781.09 |
| 4,108,304 | A | | 8/1978 | McKnight et al. |
| 4,345,634 | A | | 8/1982 | Rolland |
| 4,609,098 | A | | 9/1986 | Morgan et al. |
| 4,919,255 | A | | 4/1990 | Morgan et al. |
| 5,191,967 | A | | 3/1993 | Woltjer et al. |
| 5,429,225 | A | | 7/1995 | Schiesser et al. |
| 5,540,323 | A | | 7/1996 | Schiesser et al. |
| 5,582,286 | A | * | 12/1996 | Kalm et al. ............ 198/781.06 |
| 5,823,319 | A | | 10/1998 | Resnick et al. |
| 5,862,907 | A | | 1/1999 | Taylor |
| 5,906,267 | A | | 5/1999 | Heit et al. |
| 6,035,998 | A | | 3/2000 | Garzelloni |
| 6,065,588 | A | | 5/2000 | Cotter et al. |
| 6,193,054 | B1 | | 2/2001 | Henson et al. |
| 6,478,142 | B2 | * | 11/2002 | Cotter et al. ........... 198/781.09 |
| 2002/0004959 | A1 | | 1/2002 | Mettrie et al. |
| 2002/0092736 | A1 | | 7/2002 | Masuda |

* cited by examiner

Primary Examiner—Joseph Valenza
(74) Attorney, Agent, or Firm—Kenneth F. Pearce

(57) ABSTRACT

The invention is particularly useful for accumulation conveyors. An assembly located beneath its corresponding zone of item transporting rollers activates the item transporting rollers by lifting the accumulator's narrow belt to engage the underneath side of the item transporting rollers. Electric actuation rather than the traditional pneumatic actuation activates the assembly's vertical movement toward its corresponding zone of item transporting rollers. Whether activated or not, the assembly's rack journals a plurality of pressure rollers that remain contiguous with the narrow belt. Centering of the sideways movement of the narrow belt as the belt travels about the rack is associated with either a pivoting tracking roller journaled in the rack or a flanged pressure roller or rollers channel in the rack. A constant force takeup can be supplied to the belt.

26 Claims, 18 Drawing Sheets

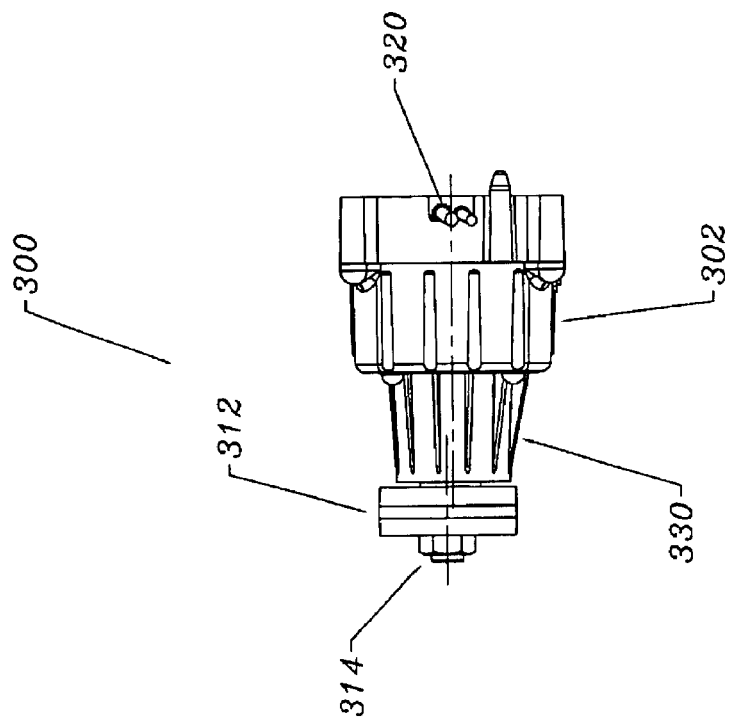
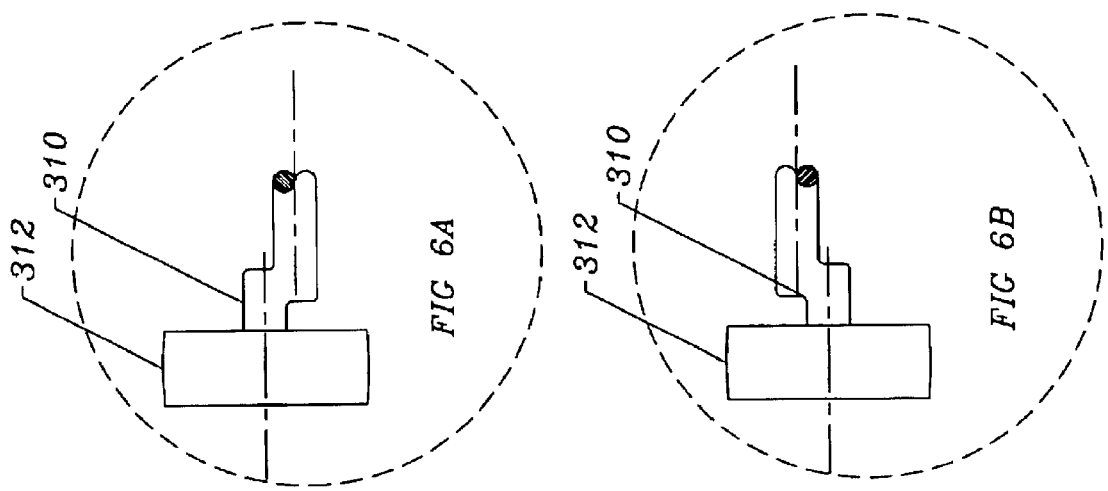
FIG. 6
FIG. 6A
FIG. 6B

NARROW BELT NON-PNEUMATICALLY ACTUATED ACCUMULATION CONVEYOR

BACKGROUND OF THE INVENTION

1. Field of the Invention

The present invention relates to structures for non-pneumatically actuated accumulation conveyors, as well as methods of using narrow belt accumulation conveyors. Generally, accumulation conveyors include numerous zones of item transporting rollers. Dependent upon predetermined paradigms, any zone of item transporting rollers can be dormant or activated. Engagement of the narrow belt with the underneath side of the zone's item transporting rollers moves goods along the topside of activated zone's item transporting rollers. More specifically, the present accumulator utilizes a non-pneumatically actuated assembly to shift the narrow belt into engagement with the underneath side of the item transporting rollers. In select embodiments, an electric actuator lifts the assembly's rack journaling a plurality of pressure rollers to contact the narrow belt and force the belt into engagement with the underneath side of the item transporting rollers. Certain embodiments can also journal a pivoting tracking roller in the assembly's rack to center the sideways movement of the belt. Other embodiments have flanged pressure rollers to center the narrow belt as it moves about the assembly's rack. And still other embodiments utilize a combination of flanged pressure rollers and a pivoting tracking roller to center sideways movement of the belt as it travels about the accumulation conveyor. Other embodiments incorporate a constant force takeup for the belt.

2. Description of the Previous Art a) U.S. Pat. No. 4,609,098-Morgan, et. al. enables pneumatic controls for the modular components of an accumulation conveyor. Each modular zone includes a rack or bar (30) positioned beneath the movable slide plates (22) of the rollers (20). The racks (30) are mounted on compressed air cylinders (31) and (32). And the belt (12) is centered by alternating the movable ends of rollers (20) from zone to zone. The '098 Patent requires pressure rollers 20 to extend across the width of the conveyor.

b) U.S. Pat. No. 5,862,907-Taylor describes a control module for an accumulation conveyor. Each module's casing (24) is mounted to the side rail of the Taylor conveyor, and each module has a sensor disposed to one side. The '907 module's logic circuitry may include a microprocessor, and Taylor's sensors can be photoelectric, proximity or ultrasonic. Although a specific driving force is not disclosed, Taylor uses a pneumatically actuated solenoid to engage his driving force.

c) U.S. Pat. No. 6,065,588-Cotter, et. al., enables a contact assembly for accumulation conveyors. Endless drive member (30) is positioned proximate to either side rail (20) or side rail (22), and the drive member (30) drives Cotter's conveying rollers. Each zone of the accumulation conveyor (10) has as least one contact assembly (50) juxtaposed with the upper portion (31) of drive belt (30) beneath the conveying rollers (25). The '588 contact assembly (50) includes support member (60) that is mounted to rail (20). Importantly, contact assembly (50) has a pneumatic block (90). Thus, compressed air vertically reciprocates platform (82).

Cotter's support member (60) has a horizontal surface (70) extending from back (64). The horizontal surface (70) is formed to have a cavity (72) that is configured to retainably receive the pneumatic diaphragm. Guide members (75) support contact member (79) enabling its vertical reciprocation with respect to support member (60). Significantly, the '588 contact member (79) includes a platform (80) that has a pair of contact rollers (84) and (86) for connecting with the upper portion (31) of drive belt (30). Cotter's arm (124) extends from side (100) and beyond end (104) of platform (80) while arm (134) extends from side (102) and beyond end (106) of platform (80). Finally, because shafts (128) and (138) extend in opposite directions, contact rollers (84) and (86) are jounaled at opposite ends of platform (80).

d) U.S. patent application No. 2001/0004959A1-Cotter, et. al. discloses a contact assembly for accumulation conveyors. Cotter utilizes a pivoting platform to support his contact rollers. In one embodiment contact rollers (84) and (86) are crowned so that when drive member (30) becomes misaligned, the crowned surface will attempt to bring endless drive member (30) into alignment with contact member (30). Since contact member 79 is capable of pivoting about post (75'), the force created between endless drive member (30) and the contact roller will tend to laterally move contact member (79). And when endless drive member (30) becomes more extensively misaligned along contact rollers (84) and (86), endless drive member (30) will contact one of the pair of out-turned flanges (85) located at opposing ends of first contact roller (84).

In another embodiment of the Cotter contact assembly, contact between protrusion (162) and contact rollers (186a, 186b) rotates platform (170) about the vertical axis of guide member (206). A widened channel of post (203) enables platform (200) to maintain the alignment between the first pair of contact rollers (186), second pair of contact rollers (188), and the endless drive member (160.)

e) U.S. Pat. No. 5,429,225-Schiesser, et. al., enables a modular pneumatic accumulation conveyor. More specifically, the '225 actuator is mechanically coupled to the product sensor (42). Schiesser's pneumatic actuator (38) is activated when his product sensor detects product, and causes the contact member (78) to interface with the upper portion (40) of drive belt (36).

f) U.S. patent application No. 2002/0092736A1-Masuda appears to disclose a device for transmitting motion to the rollers of a conveyor. In part, Paragraphs 32 and 34 of the Application read: "An actuator 17 (referring FIG. 3) making the bearing 13 swung, arranged to be located in the right of the lower part of the bearing 13, is installed on the inner side surface of the right side wall 3. This structure makes the transmission roller 14 and the driven wheel 15 located in one side of the bearing 13 and also makes the actuator 17 located in the other side of the bearing 13. By the structure like this, as the transmission roller 14 is contacted with the roller 6 by swinging the transmission roller 14 side upward . . . "

g) U.S. Pat. No. 6,193,054B1-Henson, et. al., discloses a modular accumulator conveyor system. The Henson actuator assembly (32) and its pneumatic motor (33) are positioned directly under the drive belt (20) while the 054' actuator (32) is operated by control valve (34). Finally, the upward driving run (25) is lifted upward by the pressure roller (13) mounted in the cradle (31).

h) U.S. Pat. No. 6,035,998-Garzelloni teaches a pneumatic device (20) for lifting a plurality of lifting rollers (16) that are mounted in the side channels of the frame (11) beneath the carrier rollers (14).

i) U.S. Pat. No. 5,540,323-Schiesser, et. al., teaches a pneumatic accumulation conveyor. Schiesser's contact member does not contain any rollers for engaging the driving belt. Instead, the '323 pneumatic actuator causes the low-friction slider surface of the contact member to interface with upper portion (40) of drive belt (36) such that the belt is lifted into engagement with rollers (30) adjacent the actuator (38). The Schiesser actuator (38) is juxtaposed with the upper portion (40) of drive belt (36), and a product sensor (42) is provided for each conveyor zone to control the actuators.

j) U.S. Pat. No. 5,906,267-Heit, et. al., enables a pneumatically actuated zero pressure accumulation conveyor. The '267 Patent discloses that pneumatic pressure expands bladder (64) to lift channel (46) and the upper run (24) relative to the rollers (18).

k) U.S. Pat. No. 4,919,255-Morgan, et. al. is a continuation application Patent flowing from the U.S. Pat. No. 4,609,098-Morgan, et. al. Patent.

l) U.S. Pat. No. 5,191,967-Woltjer, et. al., defines a conveyor system having a non-singulating accumulation conveyor. Each Woltjer zone (38) has a drive belt assembly that uses a pneumatic diaphragm (44) to cause the padded chain (42) to engage the conveyor's rollers (34). The '967 photodetectors provide for "zero pressure" actuation of the conveying rollers.

m) U.S. Pat. No. 5,823,319-Resnick, et. al. discloses the use of friction wheels (72) to drive rollers (74) of the '319 accumulating conveyor.

n) U.S. Pat. No. 4,345,684-Rolland teaches an accumulator conveyor utilizing a central beam (4) that supports rotors (6) for applying the drive belt (7) to be brought into a friction drive relationship with the carrier rollers (3) above the rotors (6).

o) U.S. Pat. No. 4,108,304-McKnight, et. al., enables a powered roller accumulation conveyor.

SUMMARY OF THE INVENTION

Unlike traditional zone accumulation conveyors, the present invention utilizes a rack for journaling the pressure roller or rollers. Instead of pneumatic actuators, commonly used in the industry, an electric actuator, e.g., an electric motor or a solenoid, urges the narrow belt traveling over or about the pressure rollers journaled in the rack into the underneath side of the corresponding zone's item transporting rollers. With the elimination of air compressors, lines, tubing, et cetera, associated with conventional pneumatically actuated accumulators, costs of construction are reduced.

Due to the electric actuation of assemblies carrying the rack, the numbers of zones of item transporting rollers are only limited by space for and use of the accumulator. Thus, in select embodiments, an accumulator including multiple zones of item carrying rollers is contemplated. And as another feature of the present invention, the logical paradigm allows for simultaneous activation of one or more zones of item transporting rollers.

Movable linkage or linkages or supports mounted to the accumulation conveyor's frame carry each zone's rack. The rack's length can approximate the length of its corresponding zone of item transporting rollers. In some embodiments, the actuation assembly's actuator's arm is received by an aperture of the rack's sidewall, while in other embodiments, the arm includes an offset shaft.

Upon activation of the actuator's arm, the rack is lifted vertically. Because of the movable linkage or support, the upper side of the rack remains in a substantially parallel relationship with the underneath side of its corresponding zone's item transporting rollers. In another unique feature, each actuator can be provided with a microprocessor or other type of controller located on or about the actuator. Via a logic circuit, the controllers or microprocessors of each zone communicate with their immediate upstream and/or downstream controllers or microprocessors. And depending upon predetermined parameters, each zone's microprocessor can communicate with all upstream and/or downstream zones' microprocessors.

Other embodiments of the present invention can include a pivoting tracking roller journaled in the rack as well as a constant force takeup for the belt. It has been determined that the pivoting tracking roller tends to center the narrow belt as it traverses the pressure roller or rollers. The constant force takeup adjusts the tension applied to the accumulation conveyor's belt, as the belt winds about the accumulator. Still other embodiments can utilize flanged pressure rollers alone or in combination with the pivoting tracking rollers to center the narrow belt as it rotates about the accumulation conveyor.

An object of the present invention is to provide an non-pneumatically actuated zone accumulation conveyor.

It is another object of the present invention to enable a method of using the non-pneumatically actuated zone accumulation conveyor.

Still another object of the present invention is to eliminate air compressors, pneumatic tubing, conduits, et cetera, associated with heretofore conventional accumulation conveyors.

Yet another object of the present invention is to enable an electrically actuated rack carrying a pressure roller or pressure rollers for use with zone accumulation conveyors.

Still another object of the present invention is to provide a controller or microprocessor positioned on or about an electric actuator or actuators of zone accumulation conveyors.

Yet still another object of the present invention is to utilize the invention's inactive mode to conserve energy consumption.

It is yet another object of the present invention to reduce noise output of the zone accumulation conveyor.

Still another object of the present invention is to provide a constant force takeup for the belt.

An object of an embodiment of the present invention is to incorporate a constant force spring takeup into the accumulation conveyor's drive unit.

An object of another embodiment of the present invention is to incorporate a pivoting tracking roller into the rack of a zone accumulation conveyor.

An object of an embodiment of the present invention is to journal one or more flanged pressure rollers in the rack to assist in centering the narrow belt as it travels about the accumulation conveyor.

An object of still another embodiment of the present invention to incorporate a rack utilizing a combination of a flanged pressure roller or rollers and a pivoting tracking roller to assist in centering the narrow belt as it travels about the accumulation conveyor.

An embodiment of the present invention can be described as an assembly for imparting rotation to a zone of item transporting rollers of an accumulation conveyor, comprising: a first linkage connected at a first location of a frame's side rail; an electric actuator, including an arm for generating vertical movement; a vertically movable rack, approximating the length of the zone, wherein the vertically movable rack receives the arm; a plurality of rollers jounaled in the vertically movable rack; and a controller for the electric actuator. In select embodiments, the assembly's actuator can also include a microprocessor and an offset arm.

Another embodiment of the present apparatus can be described as a non-pneumatically actuated assembly for imparting rotation to a zone of item transporting rollers of an accumulation conveyor, comprising: a first vertically movable support and a non-pneumatic actuator, including a vertically movable arm, mounted to the frame of the accumulation conveyor; a rack having an upper side substantially parallel to an underneath the zone of item transporting rollers, wherein the rack receives the arm and is connected to the first vertically movable support; a plurality of rollers channeled in said rack; an idler roller; and a controller for said non-pneumatic actuator for causing the belt to engage or disengage the underneath side of the item transporting rollers.

Yet another embodiment of the present invention can be described as an accumulation conveyor comprising: a plurality of zones of item transporting rollers; a drive for a belt for imparting rotation to the item transporting rollers; a constant force take-up for the belt; a frame holding each zone of item transporting rollers; a plurality of idler rollers; an item detecting sensor for each zone of item transporting rollers; a stationary, upward or downward movable assembly for each zone, wherein each stationary, upward or downward movable assembly is located beneath its corresponding zone of item transporting rollers, and wherein the movable assembly further comprises: a first substantially vertically movable linkage mounted to the frame, an electric actuator, including an arm for generating vertical movement, and a rack connected with the first substantially vertically movable linkage, wherein the rack journals a plurality of pressure rollers; and a controller for controlling the movable assembly in accordance with a preprogrammed paradigm.

In still another embodiment, the present invention can be described as a method of imparting rotation to a zone of item transporting rollers of an accumulation conveyor comprising the steps of: mounting an assembly, including a rack, to a frame of the accumulation conveyor such that the rack is vertically movable; journaling a plurality of pressure rollers in the rack; driving a belt about the plurality of pressure rollers and a plurality of idler rollers; applying a constant take-up force to the belt; journaling a pivoting tracking roller in the rack; positioning an item sensor in the zone; connecting the item sensor to a microprocessor located on or about an electric actuator; joining the electric actuator with the rack; and electrically actuating the rack.

Yet still another embodiment can be described as a method of imparting rotation to item transporting rollers, comprising the steps of: establishing an accumulation conveyor comprising a plurality of zones of said item transporting rollers; journaling a plurality of pressure rollers in a plurality of racks; assembling one of the racks about each said zone of item transporting rollers; driving a belt about the pressure rollers and a plurality of idler rollers; applying a constant take-up force to the belt; positioning an item sensor in each zone; providing an electric actuator for each of the racks, wherein the electric actuator further comprises a microprocessor; linking the microprocessor of each of the electric actuators with at least its upstream zone's microprocessor or its downstream zone's microprocessor; linking each microprocessor with its corresponding sensor; and actuating one or more of the racks, according to a predetermined paradigm, wherein any actuated rack shifts the belt driven about the actuated rack to engage the actuated rack's corresponding zone of item transporting rollers.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 6 is a representation of a an actuator within the scope of the present invention.

FIG. 6a is a lateral view of an activated actuator's arm.

FIG. 6b is a lateral view of a deactivated actuator's arm.

DESCRIPTION OF THE PREFERRED EMBODIMENTS

Although the disclosure hereof is detailed to enable those skilled in the art to practice the invention, the embodiments published herein merely exemplify the present invention.

Figure 1:
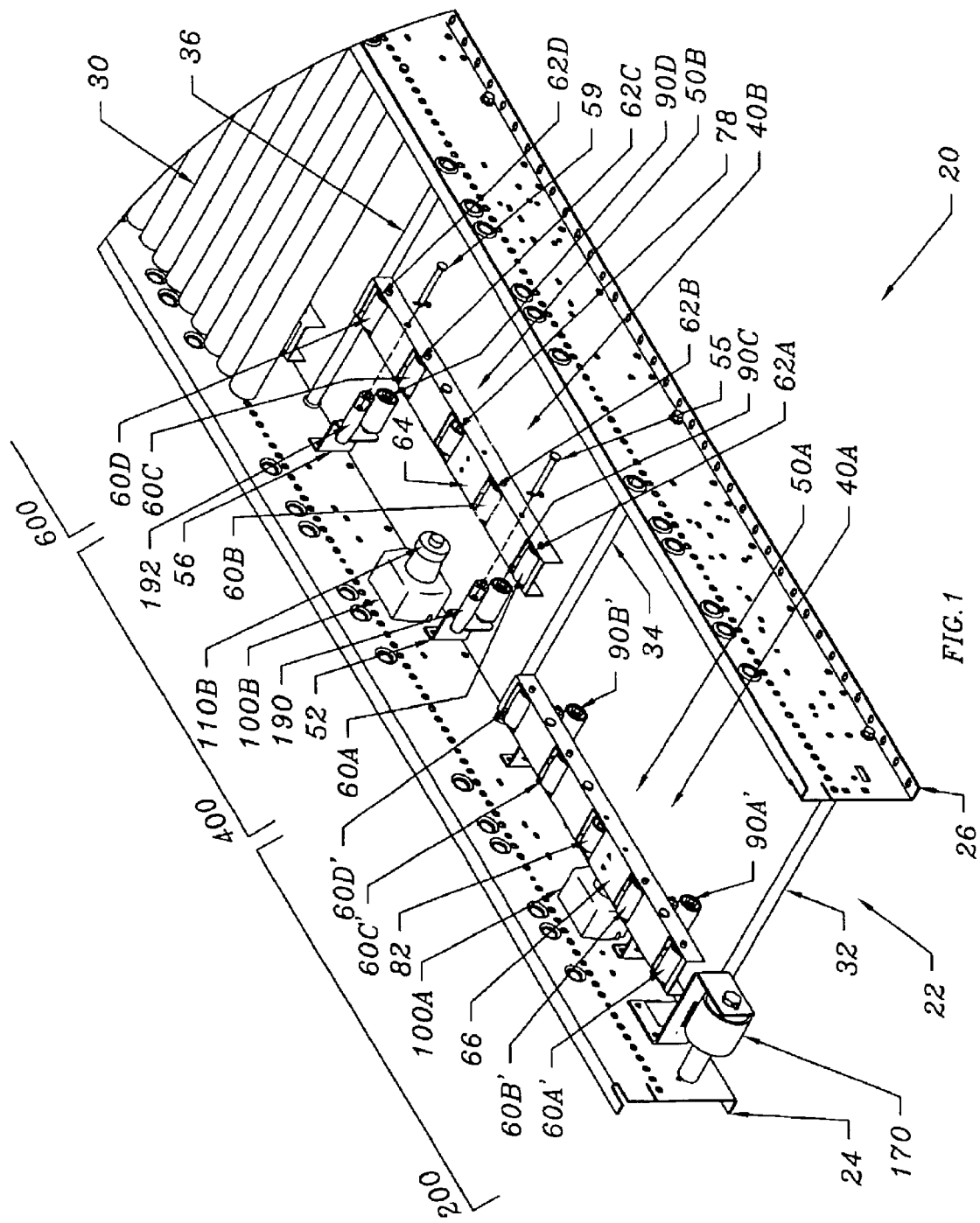
FIG. 1 is a top view of an accumulation conveyor's zones.
Figure 10:
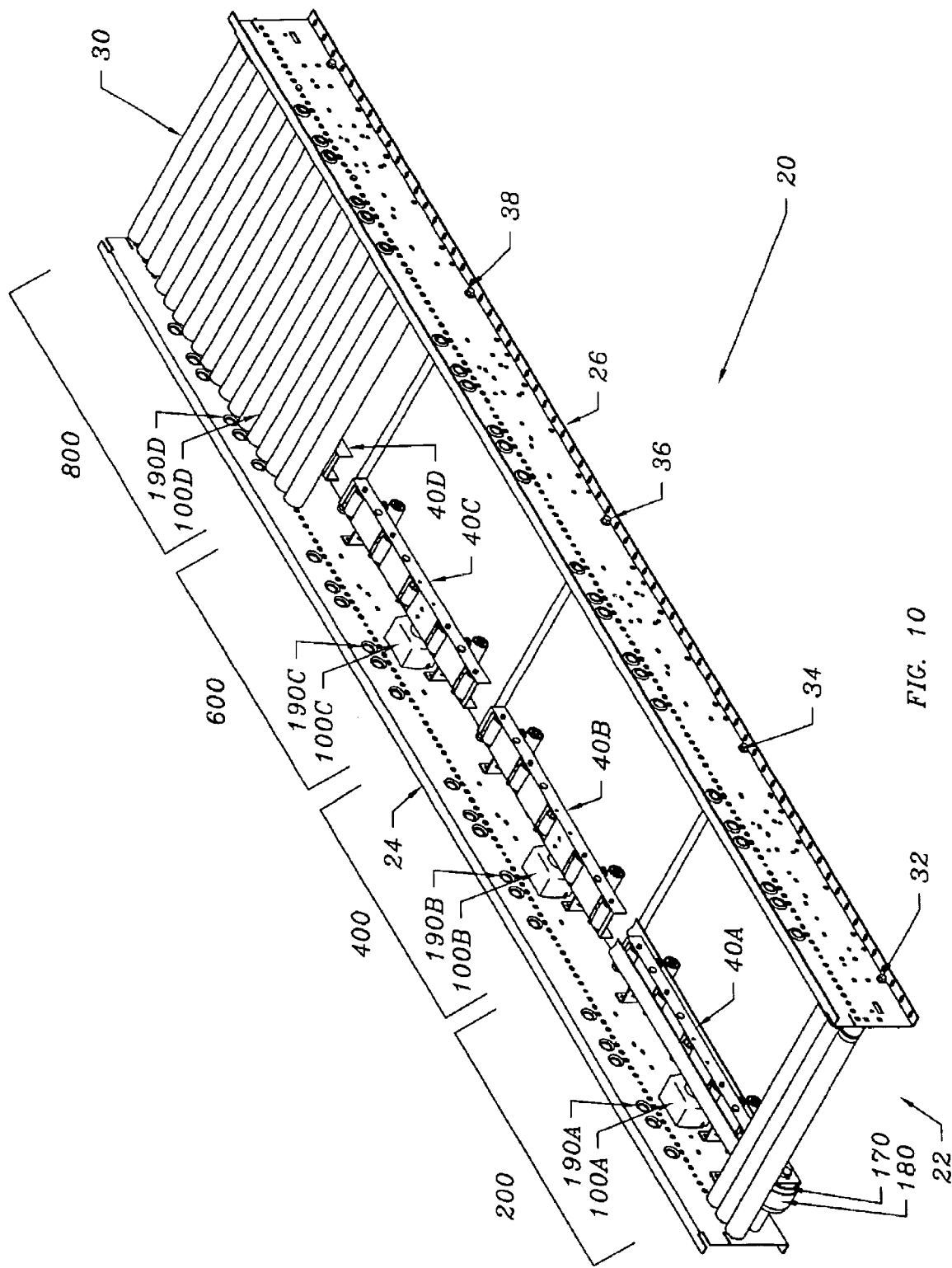
FIG. 10 is a top view cut away of an accumulation conveyor within the scope of the present invention.

FIG. 1 depicts a top view of accumulator or accumulation conveyer (20). As shown in this cutaway view, accumulator (20) discloses elements of zones (200, 400 and 600), but those skilled in the art recognize that accumulation conveyor (20) can be, as represented in FIG. 10, engineered with a multitude of zones (200, 400, 600, 800, etcetera) and their corresponding item carrying rollers (30). Accumulators, within the scope of the present invention, can convey a plethora of items—ranging from such things as boxes, baggage and cartons to any vessel of sufficient size to travel over the item conveying rollers (30).

In FIG. 1, item carrying rollers (30) have been cutaway above zones (200) and (400) while item carrying rollers (30) are shown, in part, above zone (600). Each zone (200, 400, 600, etcetera) of item carrying rollers (30) can be defined relative to its corresponding assembly (40A, 40B, 40C, etcetera). And the number of zones of item carrying rollers is only limited by space and engineering parameters.

Frame (22) of accumulator (20) includes side rails (24) and (26). Each side rail (24) and (26) has a plurality of apertures. Cross ties (32), (34) and (36) join side rails (24) and (26).

Zone (400) shows an exploded view of assembly (40B); a type of assembly within the scope of the present invention. Zone (200) depicts an assembled view of assembly (40A). As shown in FIG. 1, assembly (40A) and assembly (40B) are the same type of assembly, but as will be enabled more specifically hereinafter, the racks of the assemblies of the present invention can include a different number and kind of rollers.

Assembly (40B) includes rack (50B) while assembly (40A) includes rack (50A), so forth as so on. In select embodiments, the length of zones (200, 400, etcetera) of item carrying rollers (30) is approximate the length of corresponding racks (50A, 50B, etcetera). Since the components for zones (200, 400, etc.) of accumulation conveyor (20) can be similar, if not identical, for the sake of brevity, the exploded elements of FIG. 1's zone (400) will first be discussed. Linkage or moveable support (190) extends inward from bracket (52) mounted to side rail (24) of frame (22). Pin (55) hinges linkage (190) to rack (50B) while pin (59) hinges linkage (192) to rack (50B). Non-pneumatic or electric actuator (100B) having arm (110B) that can be received by rack (50B) is also mounted to side rail (24) of frame (22). Upper portions (62A, 62B, 62C and 62D) of pressure rollers (60A, 60B, 60C and 60D) can extend above the upper surface (64) of rack (50b) for engaging the belt (not shown). As exhibited in this view, pressure rollers (60A, 60B, 60C and 60D) are jounaled in rack (50B), but as previously disclosed other embodiments can journal or channel more or less pressure rollers in the rack, e.g., one two, three or more pressure rollers can be journaled in the rack. In this particular embodiment, pivoting tracking roller (78) is also journaled in rack (50B), but in practicing other embodiments of the present invention, pivoting tracking rollers may not incorporated into the rack. Assembly (40B) is also provided with idler rollers (90C) and (90D).

As depicted in zone (200), along with its pressure rollers (60A', 60B', 60C' and 60D'), rack (50A) can include pivoting tracking roller (82) and idler rollers (90A' and 90B'). Upper portion (82) of pivoting tracking roller (82) extends above upper surface (66) of rack (50A). Likewise the upper portions the rack's (50A) pressure rollers (60A', 60B', 60C' and 60D') can also extend above the upper surface (66) of rack (50A) to engage the belt (not shown).

Figure 2:
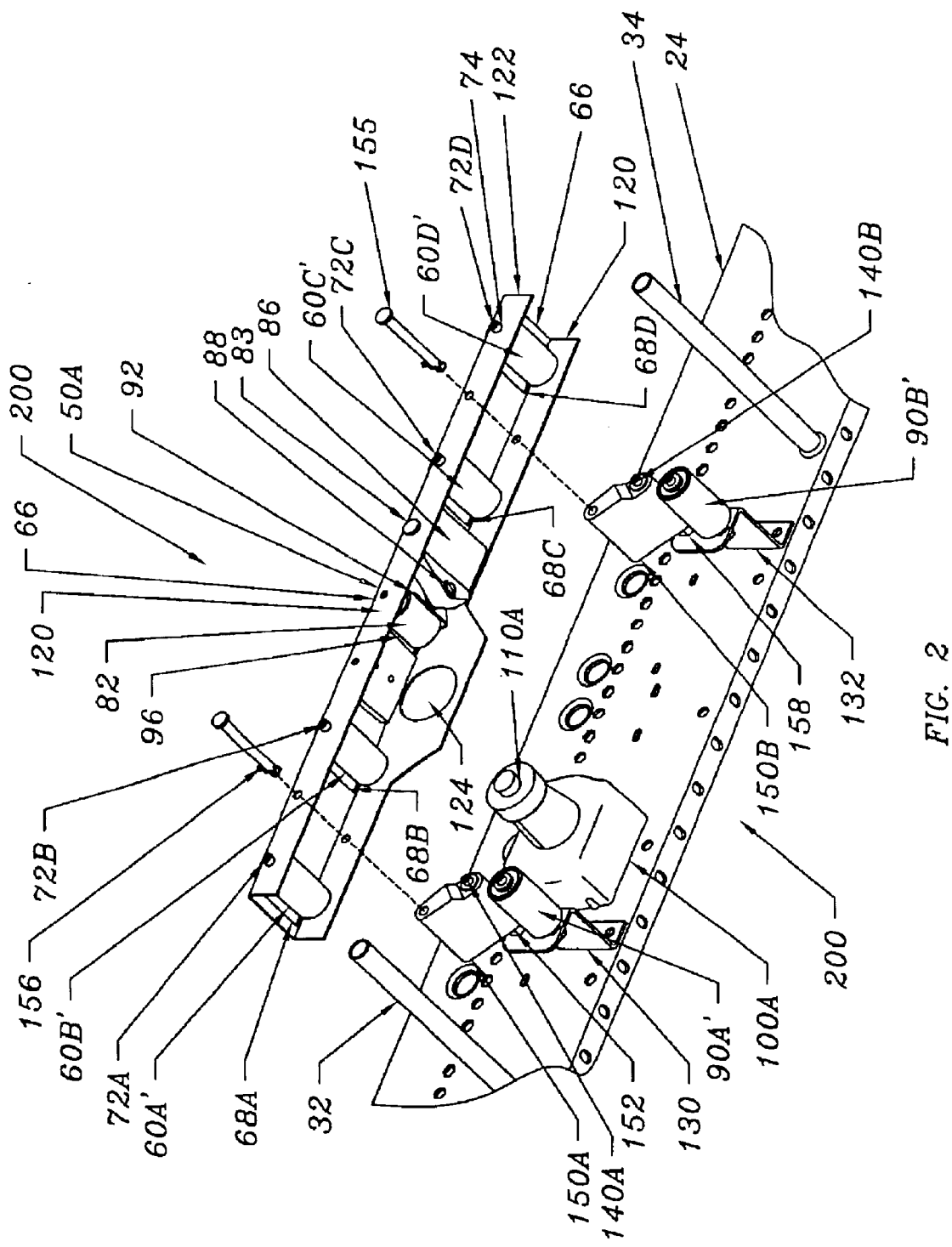
FIG. 2 is a partial bottom view of zone 200 of the present invention.

FIG. 2 is an exploded bottom view of assembly (40A) of zone (200) which does not show the narrow belt or the item carrying rollers (30). Sidewalls (120 and 122) depend downward from upper surface or side (66) of rack (50A). Upper side (66) has openings (68A, 68B, 68C and 68D) fitted for pressure rollers (60A', 60B', 60C' and 60D'). Each pressure roller (60A', 60B', 60C' and 60D') turns about its corresponding axle (72A, 72B, 72C and 72D). Sidewalls (120 and 122) of rack (50A) are provided with apertures (74) for receiving axles (72A, 72B, 72C and 72D). Sidewall (120) has aperture (124) for receiving arm (110A) of non-pneumatic or electric actuator (100A) that is mounted to side rail (24) of accumulation conveyor (20). Due to such a configuration, in select embodiments, the combination of aperture (124) of sidewall (120) and arm (110A) can provide support for rack (50A).

Figure 3:
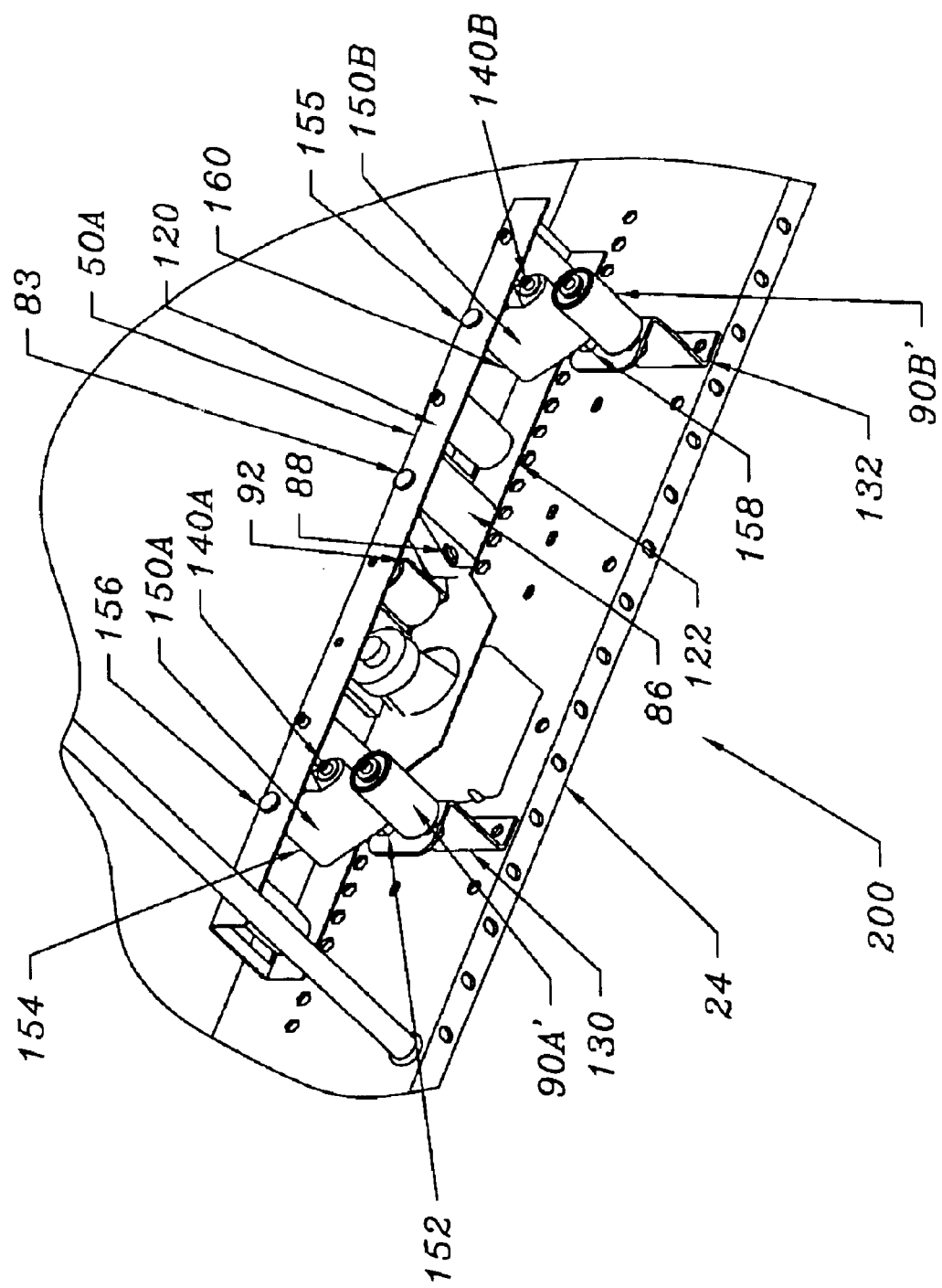
FIG. 3 is a partial bottom view of zone 200 of the present invention.

As shown in FIGS. 2 and 3, holder (86) is designed to fit between sidewalls (120 and 122) of rack (50A) as well as to hold pivoting tracking roller (82). Pin (83) and its corresponding counterpart (not shown) of holder (86) protrude though apertures of sidewalls (120 and 122) to secure holder (86) to rack (50A). Rack (50A) includes opening (96) corresponding to an upper portion of pivoting tracking roller (82). Bolt (88) attaches rotable bracket (92) journaling pivoting tracking roller (82) such that pivoting tracking roller's (82) upper portion can pivot substantially in a plane of contact with the narrow belt (not shown) and relative to sideways movements of the belt as the belt traverses about pressure rollers (60A', 60B', 60C' and 60D') and pivoting tracking roller (82) of rack (50A). In other words, upper portion of pivoting tracking roller (82) pivots in a plane that is substantially horizontal relative to the underneath side of its corresponding item transporting rollers (30), i.e., pivoting roller (82) can move relative to the sideways movement of the belt.

Figure 5:
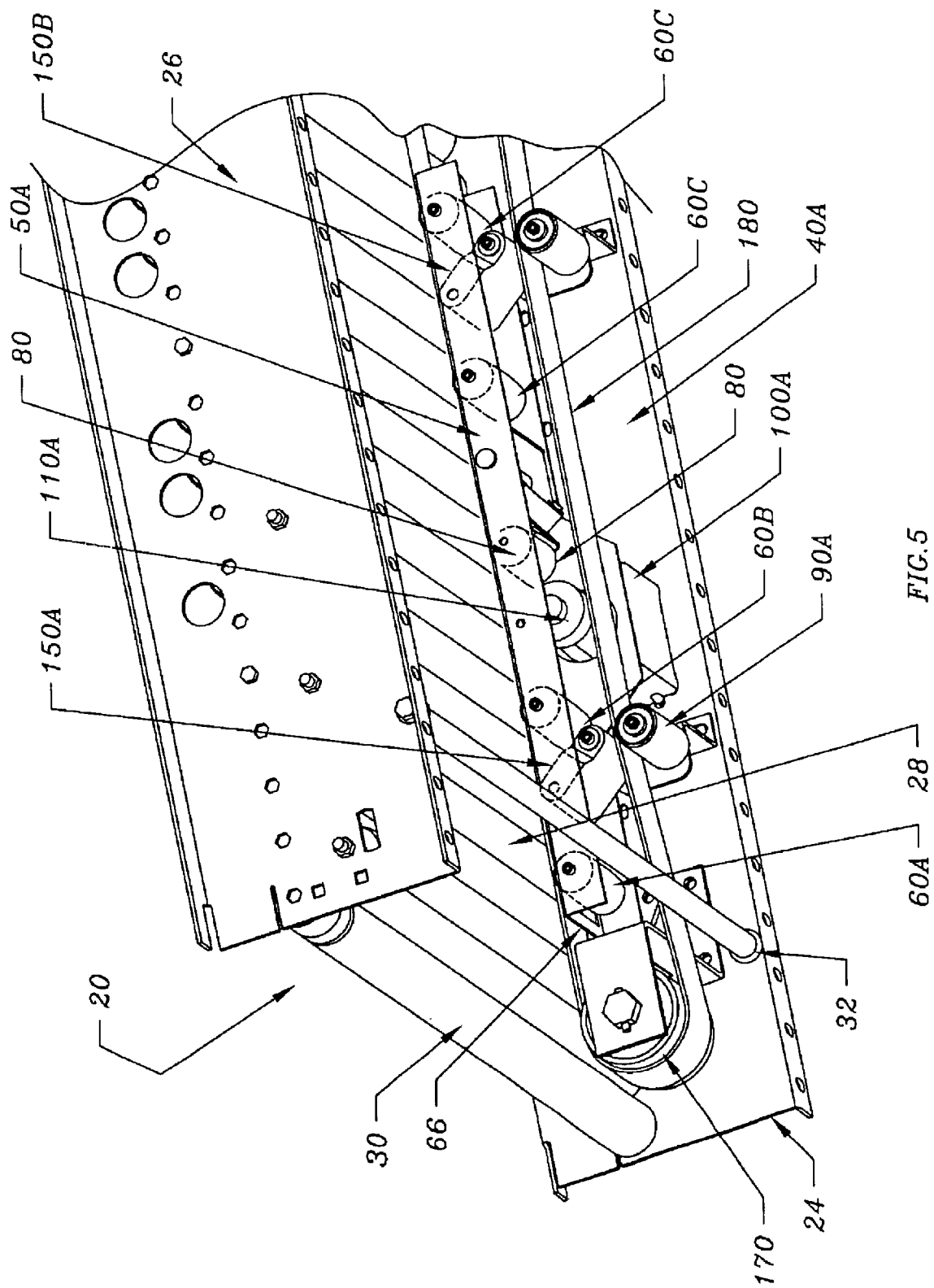
FIG. 5 is a bottom view of zone 200 of the present invention.

As best shown in FIGS. 2, 3 and 5, zone (200), mounting brackets (130 and 132) are attached, in any manner acceptable in the art, to side rail (24) of accumulation conveyor (20). Shaft (140A) extends inward from mounting bracket (130) relative to side rail (24) of accumulation conveyor (20) and shaft (140B) extends inward from mounting bracket (132). At first end (152), movable linkage (150A) is attached to shaft (140A) and at second end (154), pin (156) hinges movable linkage (150A) to rack (50A). In a similar manner, first end (158) of movable linkage (150B) is attached to shaft (140B) and pin (155) hinges movable linkage (150B) to rack (50A). As disclosed, movable linkages (150A and 150B) are four-bar linkages. However, those skilled in the art recognize other types of movable linkages or movable supports can also be utilized to maintain upper side (66) of rack (50A) in a substantially parallel spatial relationship to the underneath side (28) of the zone (200) of item transporting rollers. As shown, idler rollers (90A') and (90B') also extend inward from mounting brackets (130 and 132), but other idler roller configurations are can be utilized within the scope of the present invention.

Figure 4:
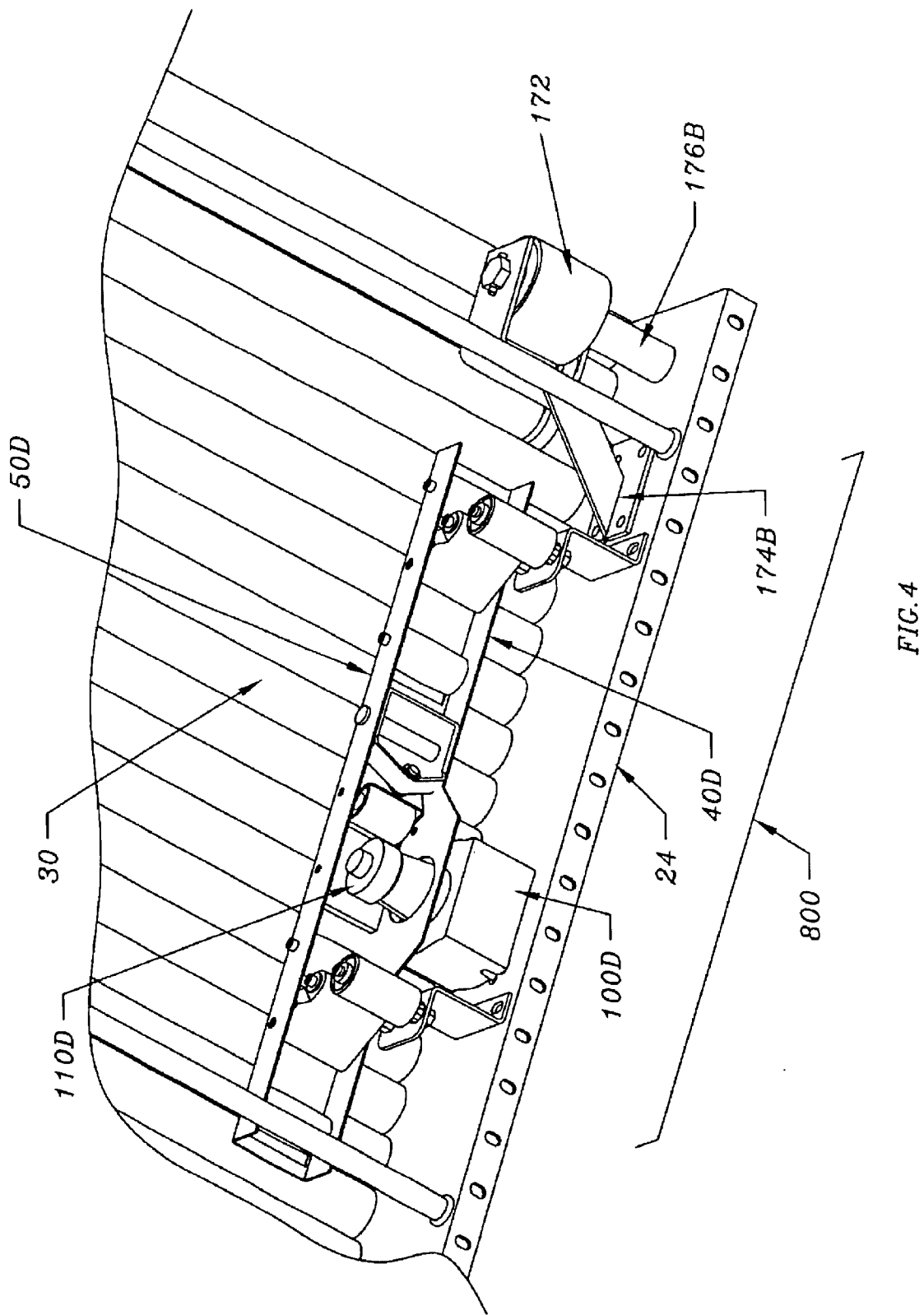
FIG. 4 is a bottom view of zone 800 of the present invention.

With a view toward FIG. 4, zone (800) of item transporting rollers (30) is portrayed. Assembly (40D) is attached to side rail (24) of frame (22) of accumulation conveyor (20). Similar to assembly (40A) enabled in FIGS. 1, 2 and 3, assembly (40D), among other elements, has rack (50D) journaling a plurality of pressure rollers and pivoting tracking roller, actuator (100D) and arm (110D). And as will be disclosed more fully below, other embodiments can include one or more flanged pressure rollers.

As shown in FIG. 4, the length of rack (50D) of assembly (40D) approximates the length of its corresponding zone's (800) item transporting rollers (30). Attached laterally of assembly (40D) is end idler roller (172). End idler roller (172) can by supported by side rail (24) in any manner acceptable in the art. In this view, mounting bracket (174B) and shaft (176B) hold end idler roller (172) in operational relationship with assembly (40D) of zone (800) of accumulation conveyor (20).

FIG. 5 exhibits a belt (180) that can engage item transporting rollers (30) of zone (200). In the embodiment shown, the width of belt (180) approximates the length of pressure rollers (60A', 60B' and 60C'). End idler roller (170) and assembly (40A) are each mounted to side rail (24) of frame (22) of accumulation conveyor (20). Cross tie (32) joins side rails (24) and (26). And movable linkages (150A and 150B) maintain upper surface (66) of rack (50A) in substantially parallel spatial relationship with underneath side (28) of item transporting rollers (30) of zone (200).

Depending upon activation or deactivation of actuator (40A), rack (50A) of assembly (40A) can be stationary, or moving upward toward, or downward from item transporting rollers (30). Upon engagement of pivoting tracking roller (80) with the narrow belt (180), pivoting tracking roller (80) can pivot relative to the sideways movement of belt (180) as the belt travels about the assembly's (40) pressure rollers. Arm (110A) is received by rack (50A). As disclosed in FIG. 5, non-pneumatic actuator (100A) is a direct current electric actuator. However, other types of non-pneumatic actuators, such as solenoids or alternating current electric actuators can be incorporated to the practice of the present invention. and FIG. 6b shows the deactivated offset shaft (310). Activated offset shaft (310) and roller bearing (312) vertically lift the rack to engage the narrow belt. In the deactivated mode, the offset shaft (310) has vertically lowered the rack away from the underneath side of its corresponding zone of item carrying rollers.

Figure 7:
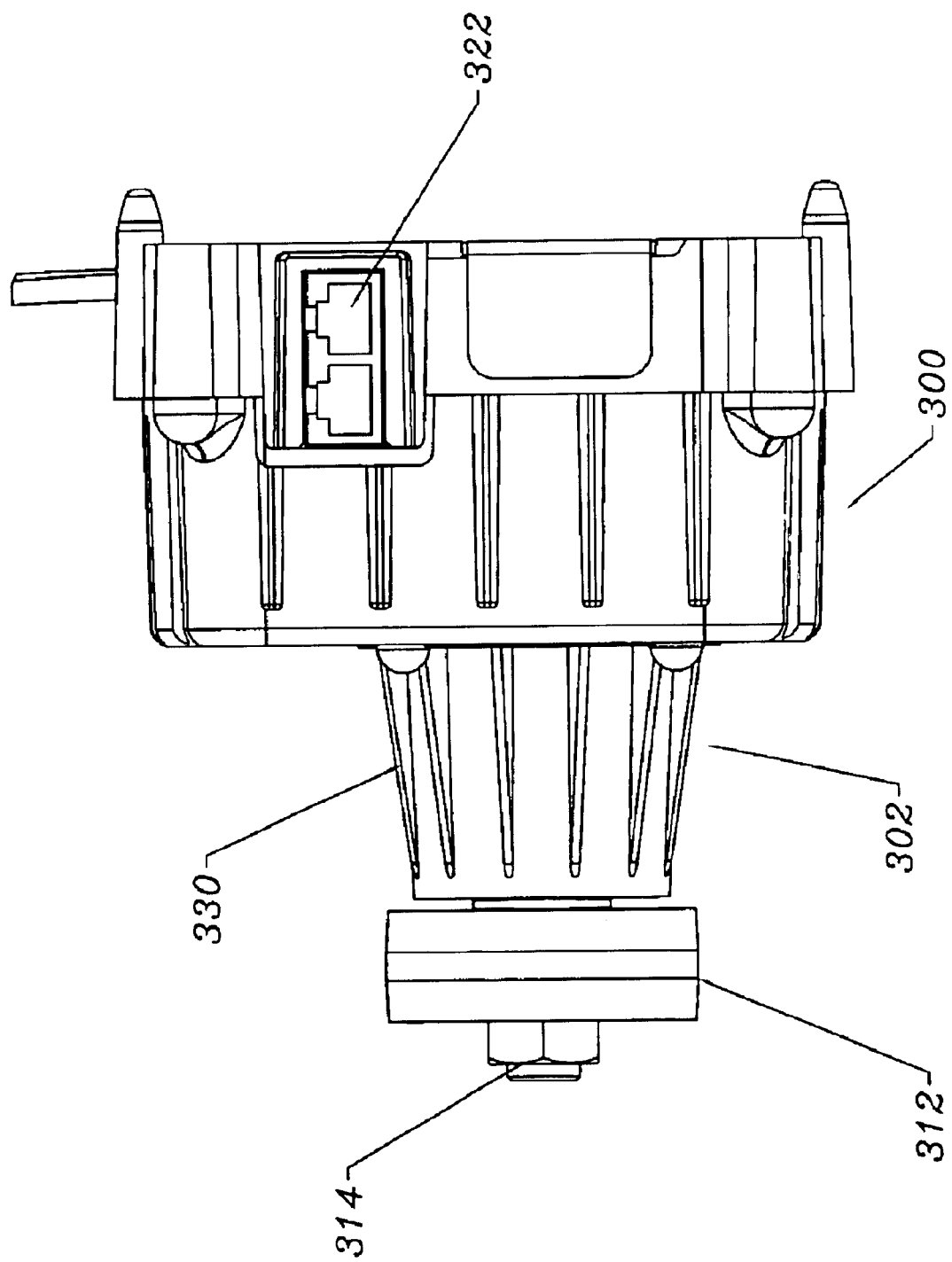
FIG. 7 is another representation of an actuator within the scope of the present invention.

With a view toward FIGS. 6 and 7, arm (330) of actuator (300) includes housing (302), offset shaft (310), roller bearing (312) and nut (314). Thus, in select embodiments arm (330) can provide support as well lift for its corresponding rack. However those skilled in the art recognize that offset shaft (310) alone can function as the actuator's movable support or arm. Lines (320) supply power to actuator (300) and connections (322) are for lines (not shown) running to the actuator's sensor.

Figure 8:
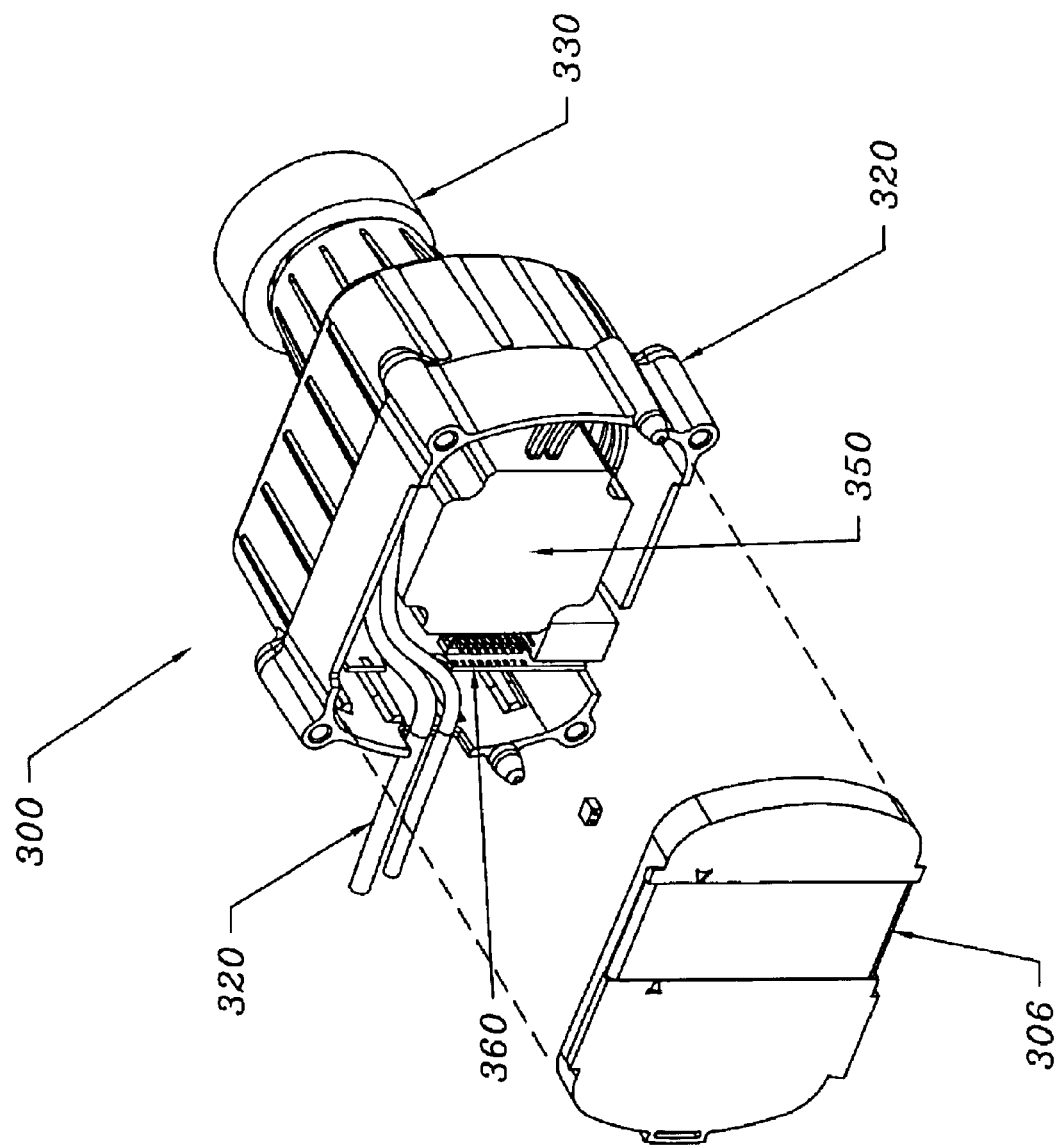
FIG. 8 is an exploded view of an actuator within the scope of the present invention.

With a view toward FIG. 8, back (306) is exploded away from housing (302) of actuator (300) to reveal electrical motor (350) and controller (360). Lines (320) supply power to stepped electrical motor (350). In this specific embodiment, stepped electrical motor (350) can generate a 180 degree rotation of offset shaft (310) of arm (330). As shown, controller (360) is a microprocessor that has been positioned inside housing (302) of actuator (300), but it is contemplated other types of controllers as well as their locations in relation to actuator (300) are within the scope of the present invention.

Figure 9:
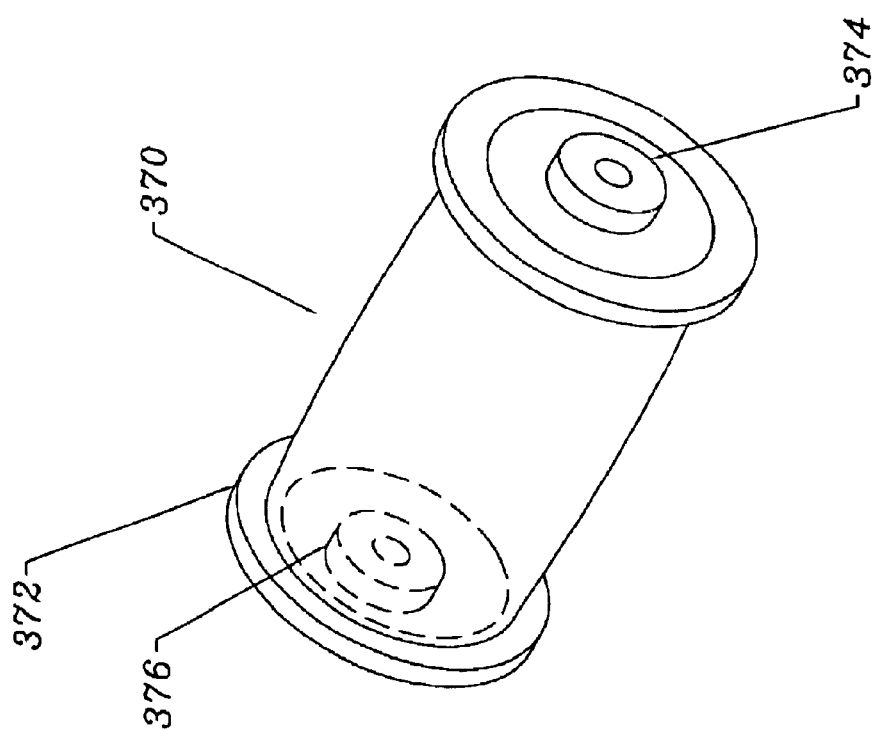
FIG. 9 is a top view of a flanged pressure roller within the scope of the present invention.

FIG. 9 is a close up of a type of pressure roller within the scope of the present invention. Pressure roller (370) has a flanged edge (372) at its first lengthwise edge and flanged edge (374) at its opposite lengthwise edge. Axle (376) runs the length of pressure roller and is sized for journaling pressure roller (370) in a rack such as one of those previously disclosed and enabled above. In select embodiments, one or more flanged pressure rollers can be incorporated into any rack to center the belt's sideways movements. In other embodiments and as previously enabled, a pivoting tracking roller can be utilized to center the narrow belt. In still other embodiments, a combination of pivoting tracking rollers and flanged pressure rollers can be utilized to center the belt. Among other things, along with providing non-pneumatic actuation of the accumulation conveyor's assemblies and the subsequent elimination of the prior art's pneumatic compressors, lines, bladders, tubing, et cetera, the practice of the present invention can meet the long felt but unfulfilled need of providing multiple means and/or combinations of structures to center the belt about the accumulation conveyor's assemblies.

As portrayed in FIG. 10, for zones (200), (400), (600) and (800), among other elements, each zone includes its corresponding assembly (40A), (40B), (40C) and (40D), as well as the zone's sensor (190A), (190B), (190C) and (190D) for detecting the presence of items in each respective zone (200), (400), (600) and (800). Any type of sensor, such as photoelectric or pressure, is within the scope of the present invention. And as previously set forth, the number of zones for accumulation conveyors in accordance with the present invention are limited only by space and engineering parameters.

Depending upon a predetermined paradigm, detection of an item or items in any zone can actuate its corresponding zone's assembly to cause the narrow belt to engage the underneath side of the zone's corresponding item transporting rollers. As previously enabled, logic can be incorporated on or about the actuators (100A), (100B), (100C) and (100D) of each zone (200), (400), (600) and (800) of accumulation conveyor (20). In one embodiment of the present invention, whenever possible, each actuator is linked (not shown) by any means convenient in the art with its immediate upstream and downstream actuator. By way of illustration, actuator (40A) is linked with actuator (40B); actuator (40B) is linked with actuators (40A) and (40C); actuator (40C) is linked with actuators (40B) and (40C), so forth and so on. In another embodiment, all actuators of the assemblies of accumulator can be linked to a logic circuit (not shown) so that each microprocessor can communicate with every other microprocessor of accumulation conveyor (20). Under such a linked actuator concept, the logic circuit and the resultant activation or deactivation of the accumulator's actuators can be controlled by a central processing unit.

Figure 11:
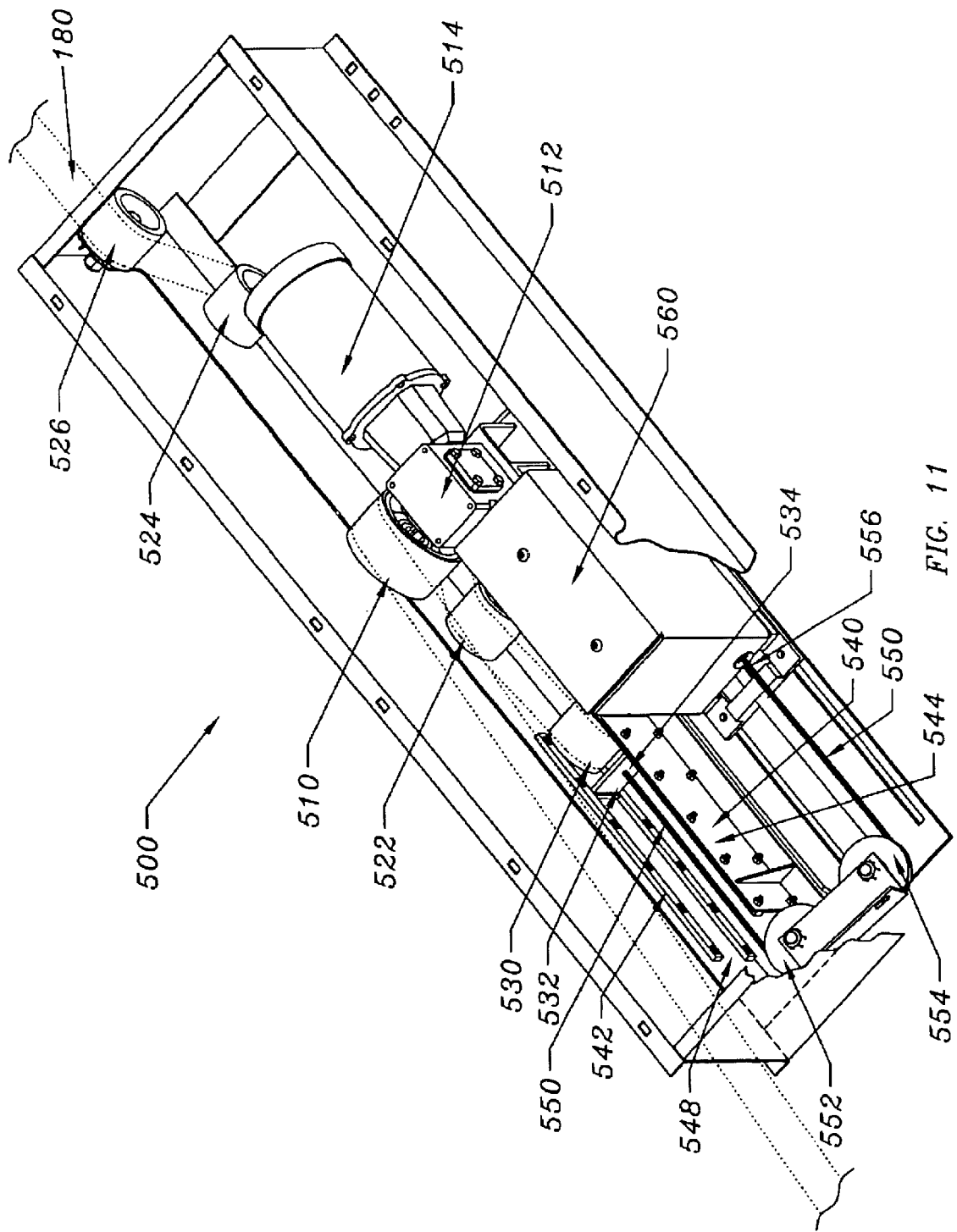
FIG. 11 is a top view pictorial of a drive pulley unit within the scope of the present invention.

FIG. 11 is a pictorial top view a type of a type of drive pulley unit (500) utilized to practice of the present invention. Narrow belt (180) shown in phantom is driven by drive pulley (510) about accumulation conveyor (20). Drive pulley (510) extends outward from gearbox (512) that is powered by electric motor (514). Snub rollers (522), (524) and (526) are aligned with drive pulley (510) for engaging narrow belt (180) as the belt winds about accumulation conveyor (20). Drive pulley (510), gearbox (512), electric motor (514) and snub rollers (522), (524) and (526) are attached to drive pulley unit (500) in any manner acceptable in the art. Takeup pulley (530) is mounted to slide (532) which can slide along guide (540). Members (542) and (544) form guide (540). As shown member (542) includes channel (548) for guiding slide (532) while member (544) also includes a channel (not shown) for guiding slide (532). Cable (550) is connected to slide (532) via connector (534) and wound about pulleys (552) and (554); thereafter, cable (550) is connected to spring motor (560) via connector (556). As portrayed in FIG. 11, spring motor (560) is a constant force spring takeup.

Figure 12:
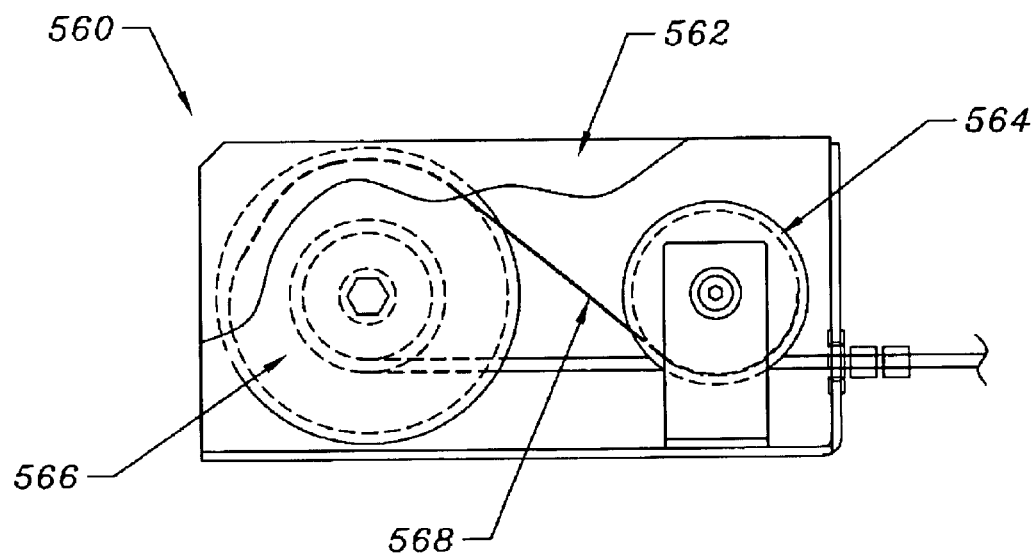
FIG. 12 is a top view representation of a spring motor in accordance with the present invention.

FIG. 12 is a top view representation of a constant force spring takeup spring motor (560). Housing (562) is cutaway to reveal storage drum (564) and takeup drum (566). Spring (568) is wound about storage drum (564) and takeup drum (566).

Figure 13:
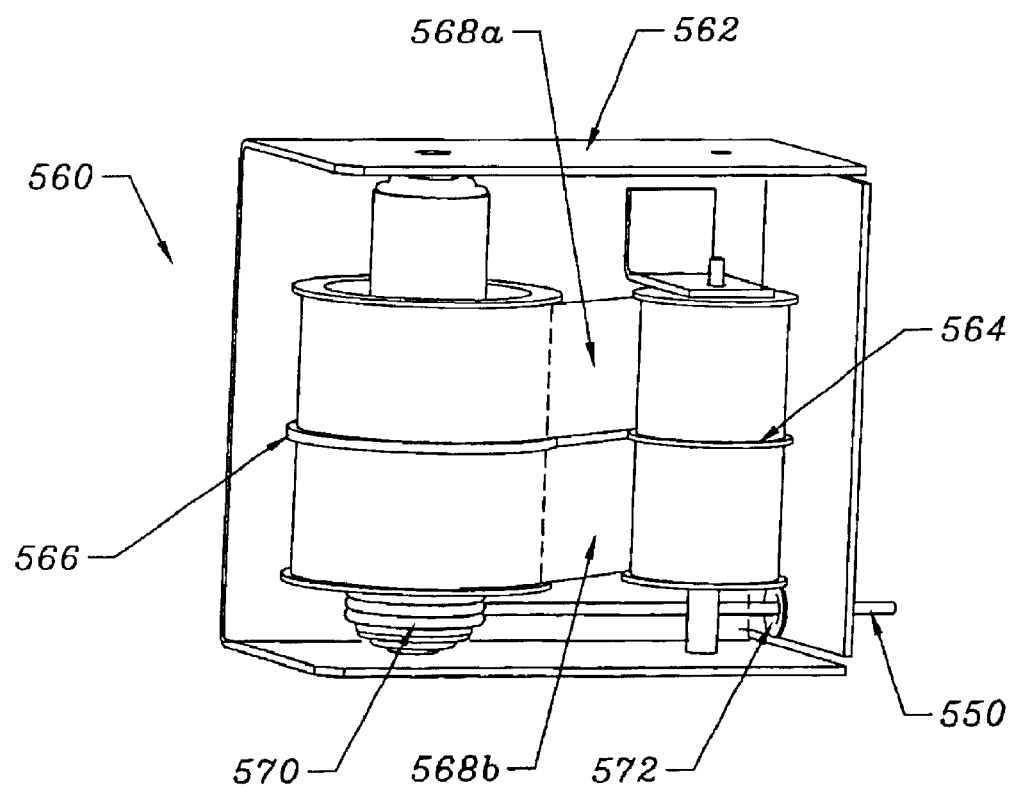
FIG. 13 a side view pictorial of a spring motor within the scope of the present invention.
Figure 14:
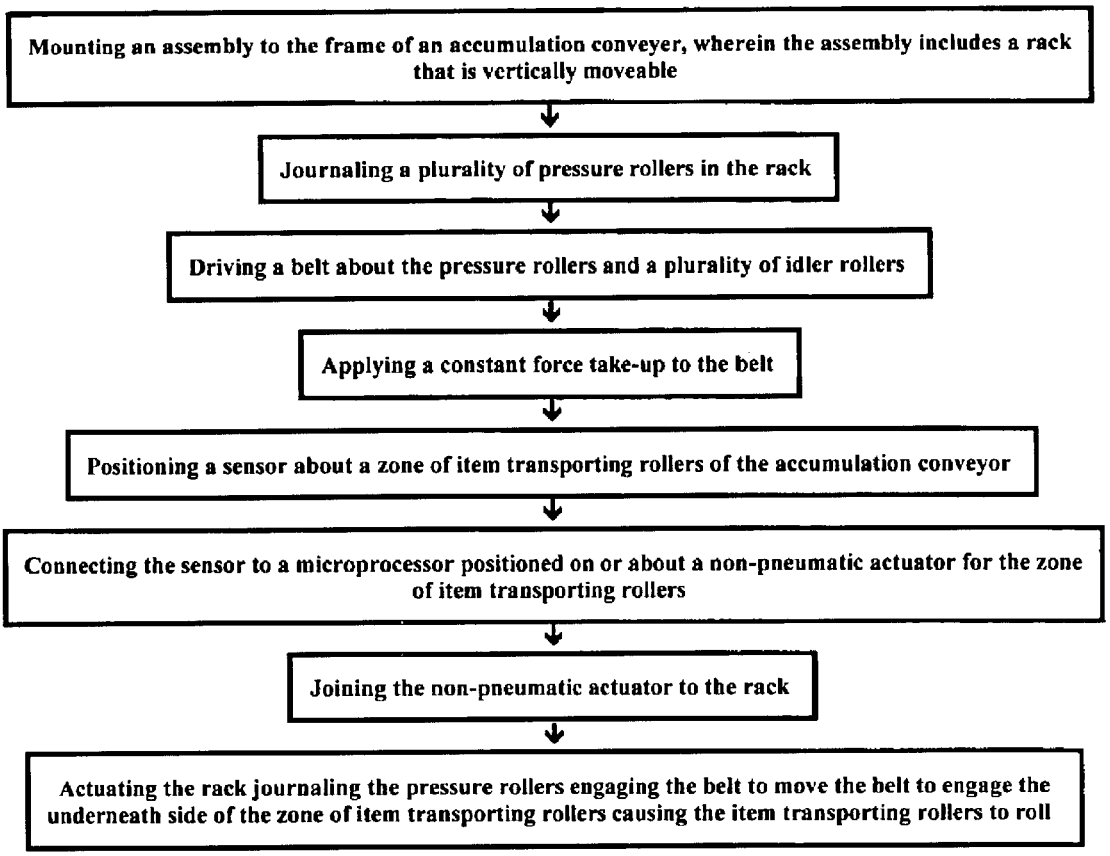
FIG. 14 is an illustration of the steps of an embodiment of the present method.
Figure 15:
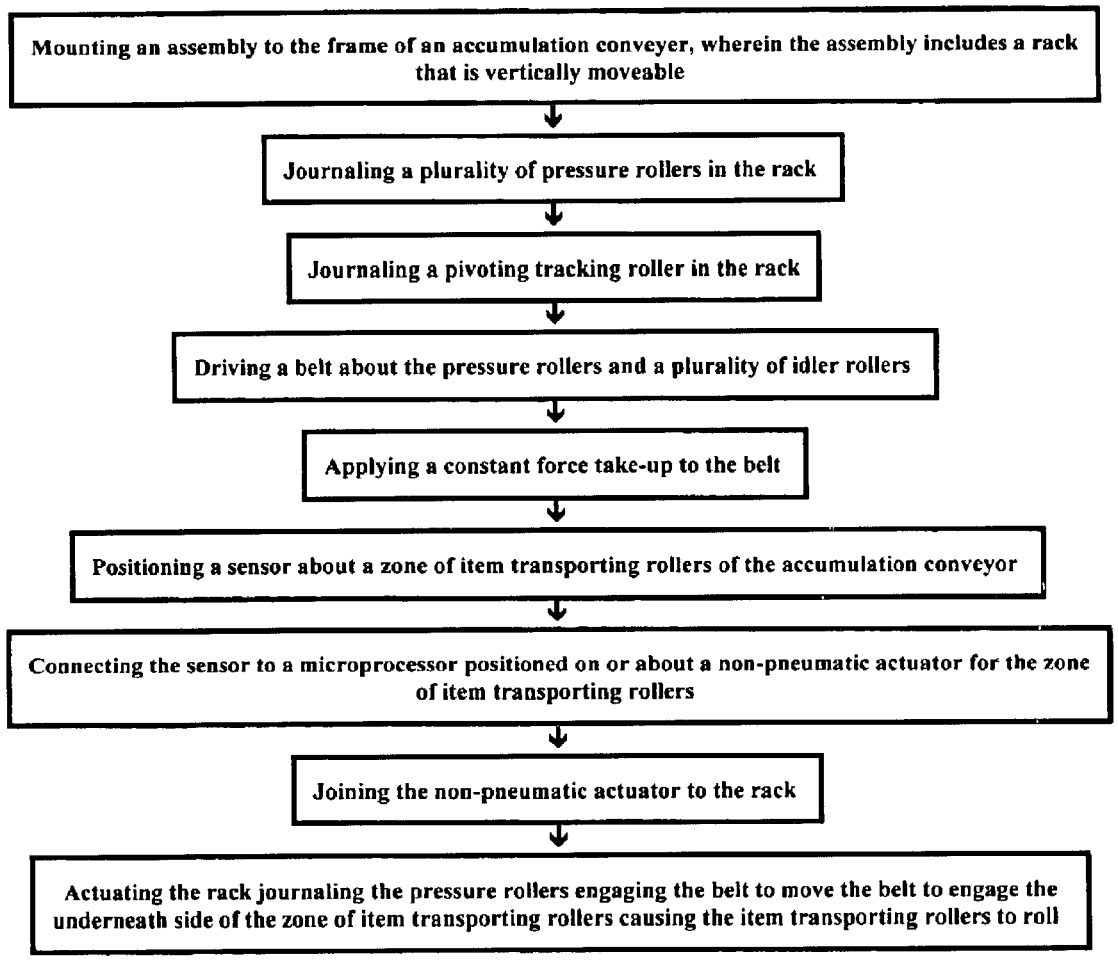
FIG. 15 is a depiction of the steps of another embodiment of the present invention.
Figure 16:
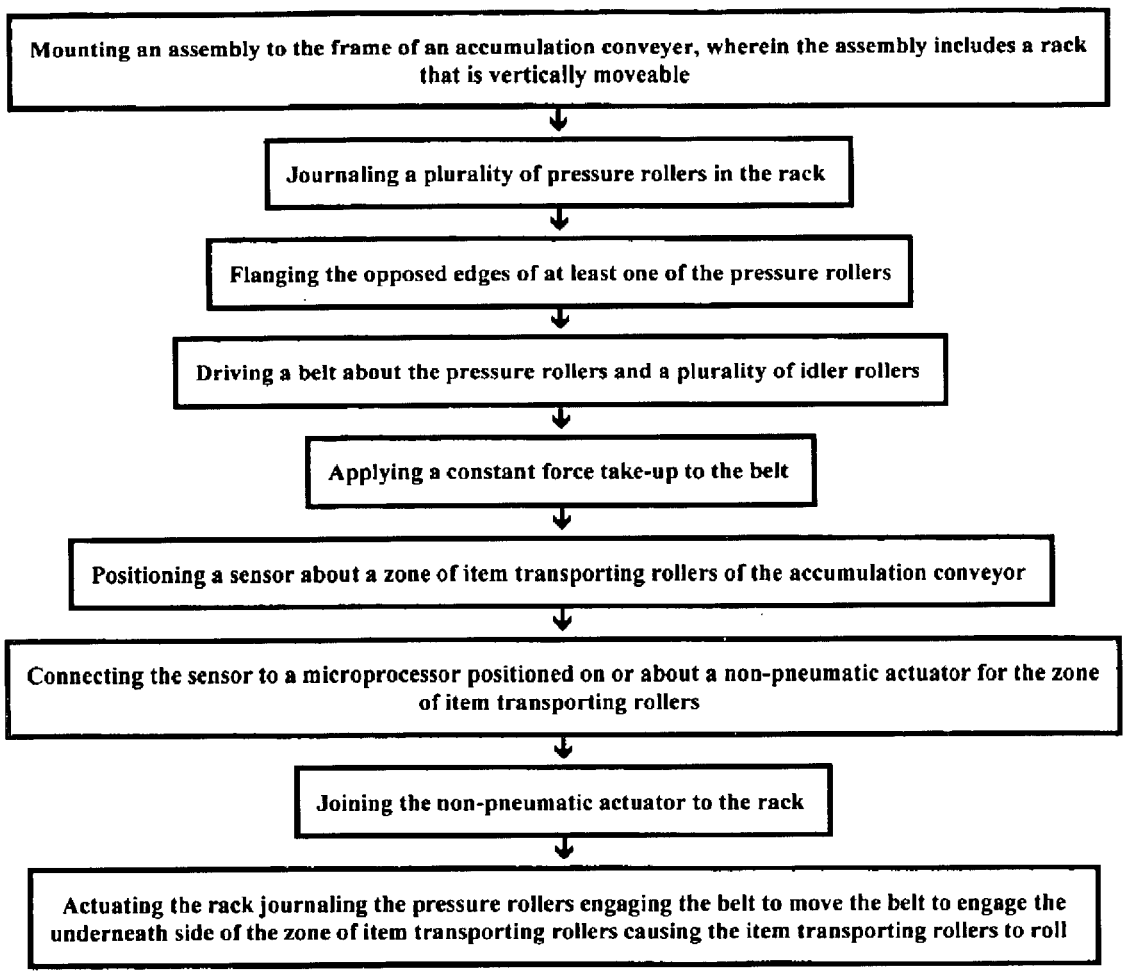
FIG. 16 is an exemplification of the steps of yet another embodiment of the current method.
Figure 17:
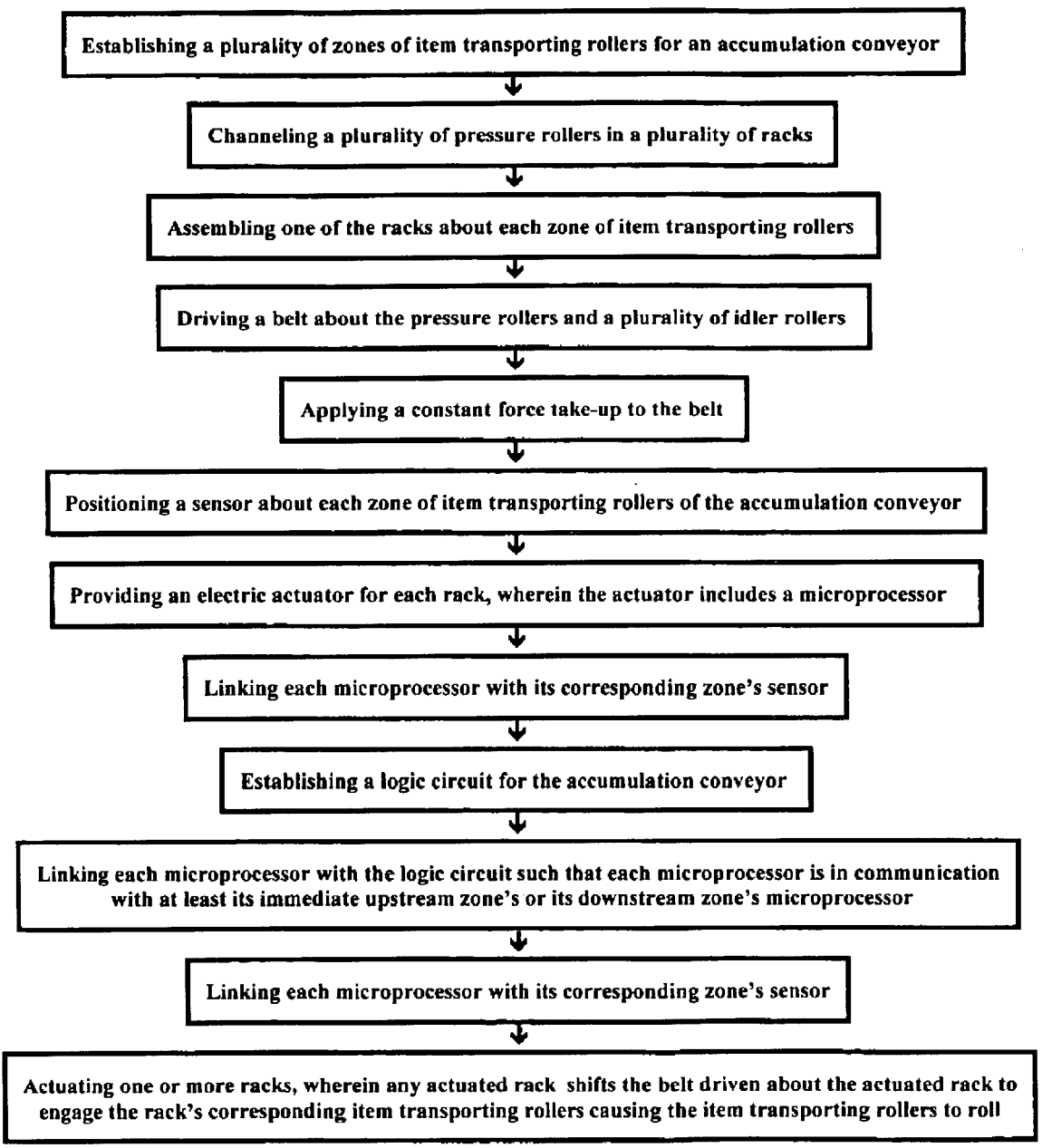
FIG. 17 is a diagrammatic representation of the steps of still another embodiment of the present invention.
Figure 18:
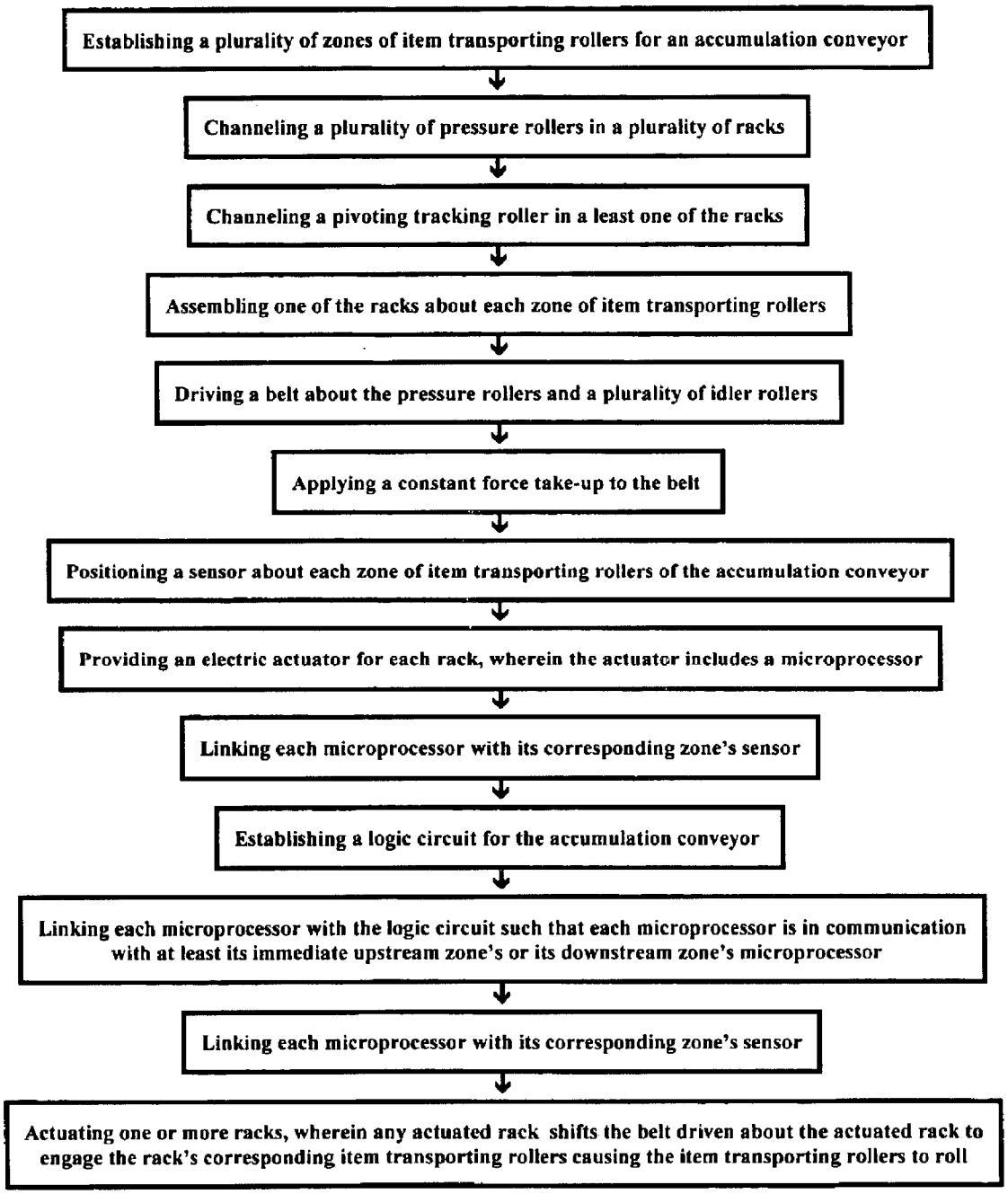
FIG. 18 is an illustration of the steps of yet another embodiment of the present method.
Figure 19:
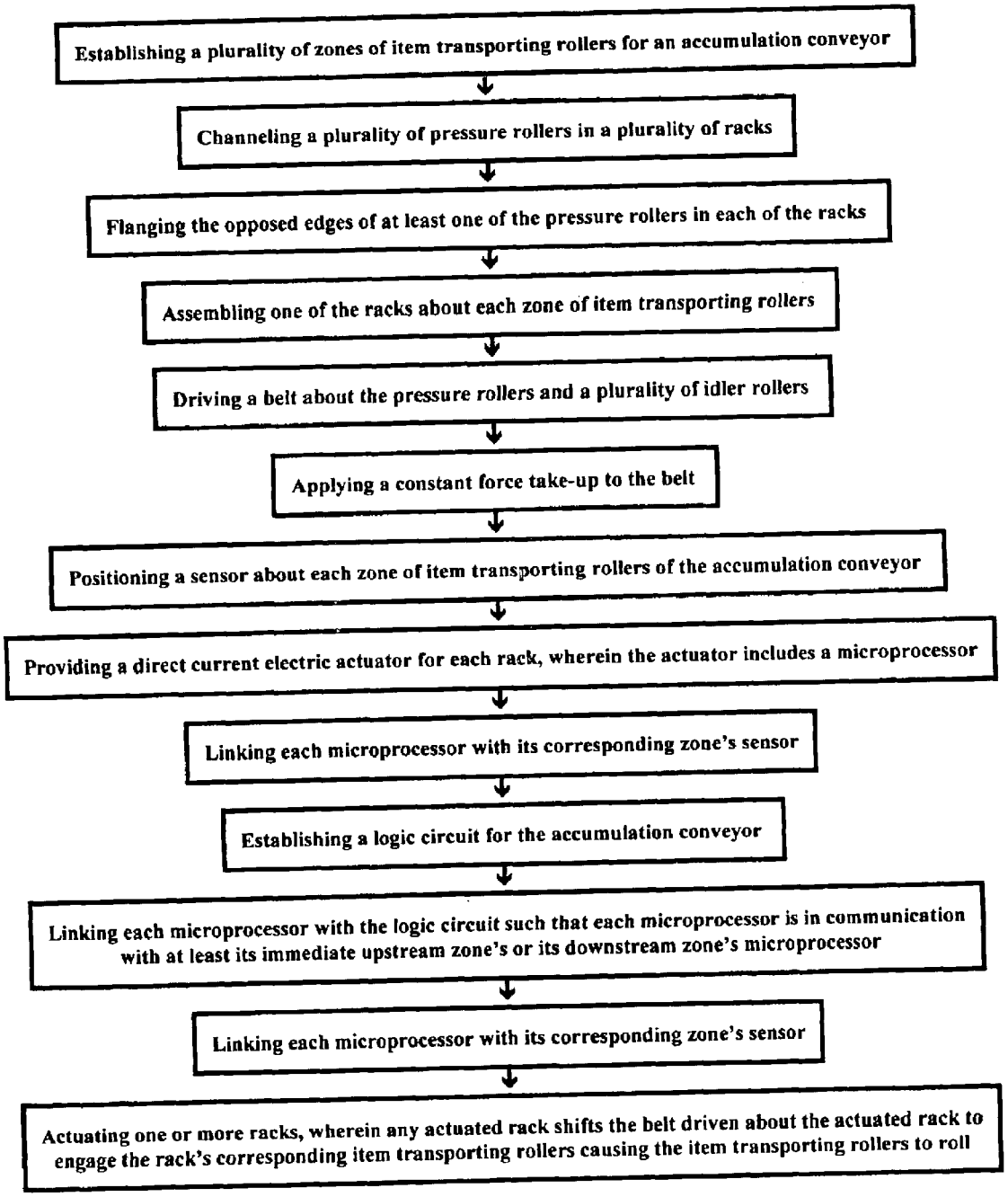
FIG. 19 is an exemplification of the steps of yet another embodiment of the current method.

FIG. 13 is a side view of spring motor (560) with housing (562) cutaway. In this specific embodiment, spring motor (560) includes constant force springs (568a and 568b), but depending upon engineering parameters, spring (560) can comprise one, two, three or more constant force springs. Takeup drum (566) and storage drum (564) are mounted inside housing (562) in any manner acceptable in the art. Winding (570) of output drum (566) extends through aperture (572) of housing (562) to connect with cable (550). In operation, the combination of spring (560), cable (550), takeup pulley (530), slide (532), guide (540), etc. applies a constant force takeup to belt (180) as the belt winds about accumulation conveyor (20).

Steps associated with the practice of the methods of present invention utilizing select structural elements enabled above are set forth in FIGS. 14–19. Having disclosed the invention as required by Title 35 of the United States Code, Applicants now pray respectfully that Letters Patent be granted for their invention in accordance with the scope of the claims appended hereto.

What is claimed is:

1. An assembly for engaging a belt for imparting rotation to item transporting rollers of a zone of an accumulation conveyor, said assembly comprising:
   a) a first linkage connected at a first location of a frame of said accumulation conveyor;
   b) an electric actuator connected to said frame of said accumulation conveyor; said electric actuator further including an arm for generating vertical movement;
   c) a vertically movable rack receiving said arm, wherein said arm can function as a support member for said vertically movable rack, and said vertically movable rack being supported by said first linkage such that an upper side of said vertically movable rack is in a substantially parallel relationship to an underneath side of said item transporting rollers;
   d) a plurality of pressure rollers journaled in said vertically movable rack for engaging said belt, wherein an upper portion of at least one of said plurality of pressure rollers extends above said upper side of said vertically movable rack for engaging said belt; and
   e) a controller for said electric actuator for causing said belt to engage or disengage said underneath side of said item transporting rollers.

2. The invention of claim 1 wherein said arm further comprises an offset shaft.

3. The invention of claim 2 further comprising a second linkage connected at a second location of said frame of said accumulation conveyor for supporting said rack.

4. The invention of claim 3 wherein said controller is a microprocessor positioned on or about said electric actuator and linked to a logic circuit.

5. The invention of claim 4 further comprising a pivoting tracking roller journaled in said rack.

6. The invention of claim 4 wherein one of said plurality of a pressure rollers further comprises flanges opposed at its lengthwise edges.

7. The invention of claim 6 further comprising a pivoting tracking roller journaled in said rack.

8. An actuated assembly for engaging a narrow belt for imparting rotation to a zone of item transporting rollers of an accumulation conveyor, said actuated assembly comprising:
   a) a first vertically movable support mounted to a frame of said accumulation conveyor;
   b) an actuator mounted to said frame of said accumulation conveyor, wherein said actuator further includes a vertically movable arm;
   c) a rack including an aperture; said rack approximating a length of said zone of said accumulation conveyor and having an upper side substantially parallel to an underneath side of said zone of item transporting rollers, wherein:
      i) said aperture receives said vertically movable arm that can provide support for said rack; and wherein
      ii) said rack connects at a first location with said first vertically movable support;
   d) a plurality of rollers channeled in said rack for engaging said narrow belt;
   e) an idler roller; and
   f) a controller positioned on or about said actuator for causing said narrow belt to engage or disengage said underneath side of said item transporting rollers.

9. The invention of claim 8 further comprising a second vertically movable support connected at a second location of said frame of said accumulation conveyor and said rack.

10. The invention of claim 9 wherein said arm further comprises an offset shaft.

11. The invention of claim 10 wherein said first movable support, said second movable support, said frame and said rack are a four-bar linkages.

12. The invention of claim 11 wherein said non-pneumatic actuator is a direct current actuator.

13. The invention of claim 12 wherein at least two of said plurality of rollers are pressure rollers; each of said two of said pressure rollers further comprising flanges opposed at its lengthwise edge.

14. The invention of claim 13 wherein at least one of said plurality of rollers is a pivoting tracking roller having an upper portion for pivoting substantially in a plane of contact with said belt and relative to a sideways movement of said belt.

15. An accumulation conveyor comprising:
   a) a plurality of zones of item transporting rollers;
   b) a drive for a belt for imparting rotation to said item transporting rollers;
   c) a constant force takeup for said belt;
   d) a frame holding each zone of item transporting rollers;
   e) a plurality of idler rollers;
   f) an item detecting sensor for each zone of item transporting rollers; and
   g) a stationary, upward or downward movable assembly for each zone of said plurality of zones of item transporting rollers, wherein each said stationary, upward or downward movable assembly is located beneath its corresponding zone of item transporting rollers, and wherein each said stationary, upward or downward movable assembly further comprises:
      i) a first substantially vertically movable linkage mounted to said frame;
      ii) an electric actuator mounted to said frame further including an arm for generating vertical movement; and
      iii) a rack;
         A) receiving said arm that can support said rack;
         B) connected with said first substantially vertically movable linkage; and
         C) journaling a plurality of pressure rollers engaging said belt; and
      iv) a microprocessor;
         A) positioned on or about each said stationary, upward or downward movable assembly's electric actuator; and
         B) linked to a logic circuit of said accumulation conveyor.

16. The invention of claim 15 wherein at least one of said plurality of pressure rollers includes flanges opposed at its lengthwise edges.

17. The invention of claim 16 wherein said constant force takeup further comprises:

a) a spring motor;

b) a takeup pulley engaging said belt and riding in a slide;

c) a guide for said slide; and d) a connection between said spring motor and said slide.

18. The invention of claim 17 wherein each said stationary, upward or downward movable assembly further comprises a second substantially vertically movable linkage mounted to said frame and said stationary, upward or downward movable assembly's rack.

19. The invention of claim 18 further comprising a pivoting tracking roller jounaled in at least one of said accumulation conveyor's stationary, upward or downward movable assemblies.

20. The invention of claim 19 wherein each zone's plurality of pressure rollers comprises at least two pressure rollers including opposing flanged edges.

21. A method of imparting rotation to a zone of item transporting rollers of an accumulation conveyor comprising the steps of:

a) mounting an assembly, including a rack, to a frame of said accumulation conveyor such that said rack is vertically movable;

b) journaling a plurality of pressure rollers in said rack;

c) journaling a pivoting tracking roller in said rack for centering sideways movement of said belt as said belt engages said plurality of pressure rollers;

d) driving a belt about said plurality of pressure rollers and a plurality of idler rollers;

e) applying a takeup force to said belt;

f) positioning an item sensor in said zone of item transporting rollers for detecting items;

g) connecting said item sensor to a microprocessor located on or about an electric actuator;

h) joining an electric actuator with said rack; and i) actuating said rack journaling said plurality of pressure rollers engaging said belt to move said belt to engage an underneath side of said zone of item transporting rollers.

22. The method of claim 21 further comprising the step of flanging the opposed lengthwise edges of at least one of said plurality of pressure rollers.

23. A method of imparting rotation to item transporting rollers of an accumulation conveyor, comprising the steps of:

a) establishing a plurality of zones of said item transporting rollers of said accumulation conveyor;

b) channeling a plurality of pressure rollers in a plurality of racks;

c) assembling one of said plurality of racks about each said zone of item transporting rollers;

d) driving a belt about said plurality of pressure rollers and a plurality of idler rollers;

e) applying a constant takeup force to said belt;

f) positioning an item sensor about each said zone of item transporting rollers;

g) providing an electric actuator for each of said plurality of racks, wherein each said electric actuator further comprises a microprocessor;

h) linking each said microprocessor of each of said electric actuators with its corresponding zone's sensor;

i) establishing a logic circuit for said accumulation conveyor;

j) linking said microprocessor of each of said electric actuators with said logic circuit such that each said microprocessor is in communication with at least its upstream zone's microprocessor or its downstream zone's microprocessor; and k) actuating one or more of said plurality of racks, according to a predetermined paradigm, wherein any actuated rack shifts said belt driven about said actuated rack to engage said actuated rack's corresponding zone of item transporting rollers.

24. The method of claim 23 further comprising the step of channeling a pivoting tracking roller in each said rack of said plurality of racks for centering sideways movement of said belt.

25. The method of claim 23 further comprising the step of flanging opposing lengthwise edges of at least two pressure rollers of each said rack's plurality of pressure rollers for centering sideways movement of said belt.

26. The method of claim 25 further comprising the step of channeling a pivoting tracking roller in each said rack of said plurality of racks.

* * * * *

UNITED STATES PATENT AND TRADEMARK OFFICE
CERTIFICATE OF CORRECTION

PATENT NO. : 6,814,222 B2
DATED : November 9, 2004
INVENTOR(S) : Henson, Mark W. et al.

It is certified that error appears in the above-identified patent and that said Letters Patent is hereby corrected as shown below:

Title page,
Item [75], Inventors, should read:
-- Mark W. Henson, Danville, KY (US); James M. Dickman, Rising Sun, IN (US); James W. Halsey, Cincinnati, OH (US); Michael O. Piazza, Danville, KY (US); Bobby A. Shields, Danville, KY (US); Eldon L. Goates, Colorado Springs, CO (US) --.

Signed and Sealed this

Fourteenth Day of February, 2006

JON W. DUDAS
*Director of the United States Patent and Trademark Office*